(12) United States Patent
Ichimura et al.

(10) Patent No.: US 8,304,074 B2
(45) Date of Patent: Nov. 6, 2012

(54) HIGHLY DISPERSIBLE FINE POWDER OF ALKALINE EARTH METAL CARBONATE

(75) Inventors: Yojiro Ichimura, Yamaguchi (JP); Takashi Watanabe, Yamaguchi (JP); Fumio Okada, Yamaguchi (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 211 days.

(21) Appl. No.: 12/530,919

(22) PCT Filed: Mar. 12, 2008

(86) PCT No.: PCT/JP2008/054500
§ 371 (c)(1),
(2), (4) Date: Sep. 11, 2009

(87) PCT Pub. No.: WO2008/111612
PCT Pub. Date: Sep. 18, 2008

(65) Prior Publication Data
US 2010/0040885 A1    Feb. 18, 2010

(30) Foreign Application Priority Data

Mar. 13, 2007  (JP) .................................. 2007-063764

(51) Int. Cl.
*B32B 5/16* (2006.01)
*C01F 11/18* (2006.01)

(52) U.S. Cl. .......................... 428/402; 423/430; 423/432
(58) Field of Classification Search .................. None
See application file for complete search history.

(56) References Cited

U.S. PATENT DOCUMENTS

| | | | | |
|---|---|---|---|---|
| 4,159,312 A | * | 6/1979 | Shibazaki et al. | 423/268 |
| 4,244,933 A | * | 1/1981 | Shibazaki et al. | 423/430 |
| 5,007,964 A | * | 4/1991 | Tsukisaka et al. | 106/464 |
| 5,989,332 A | * | 11/1999 | Weitzel et al. | 106/464 |
| 7,341,704 B2 | * | 3/2008 | Kasahara et al. | 423/419.1 |
| 2010/0055460 A1 | * | 3/2010 | Ichimura et al. | 428/402 |

FOREIGN PATENT DOCUMENTS

| | | |
|---|---|---|
| JP | 2004-059372 | 2/2004 |
| JP | 2006-206425 | 8/2006 |

* cited by examiner

*Primary Examiner* — Hoa (Holly) Le
(74) *Attorney, Agent, or Firm* — Nixon Peabody LLP; Jeffrey L. Costellia

(57) ABSTRACT

A fine powder of an alkaline earth metal carbonate selected from the group consisting of barium carbonate, strontium carbonate and calcium carbonate, in which a primary particle of the powder has a mean diameter of 30 to 90 nm, in which the mean diameter is measured on a circle obtained from a projected area of the primary particle, and in which an accumulated volume of micropores having a pore size in the range of 10 to 20 nm is not less than $5 \times 10^{-2}$ cm$^3$/g can be easily dispersed in an aqueous medium in the form of essentially primary particles by an industrially employable dispersing method.

7 Claims, No Drawings

HIGHLY DISPERSIBLE FINE POWDER OF ALKALINE EARTH METAL CARBONATE

FIELD OF THE INVENTION

The present invention relates to a fine alkaline earth metal carbonate powder showing high dispersibility, in which the alkaline earth metal carbonate is selected from the group consisting of strontium carbonate, barium carbonate and calcium carbonate.

BACKGROUND OF THE INVENTION

Alkaline earth metal carbonate powders such as a barium carbonate powder, a strontium carbonate powder and a calcium carbonate powder can be employed for preparing a dielectric ceramic powder. For instance, the barium carbonate powder is employable for the preparation of barium titanate, the strontium carbonate powder is employable for the preparation of powdery strontium titanate, and the barium carbonate powder and calcium carbonate powder are employable for the preparation of powdery barium calcium titanate. The dielectric ceramic powder is utilized for producing a dielectric ceramic layer of a multilayer ceramic capacitor.

Since it is required to provide an electronic device with a smaller size, a multilayer ceramic capacitor is required to have a smaller size. In order to manufacture a multilayer ceramic capacitor having a smaller size, a dielectric ceramic layer should have a less thickness. In order to produce a dielectric ceramic layer having a less thickness, it is required to provide a fine dielectric ceramic powder having a uniform composition.

For the purpose of preparing a fine dielectric ceramic powder (such as powdery strontium titanate, powdery barium titanate, or powdery barium calcium titanate), it is necessary to prepare a fine barium carbonate powder, a fine strontium carbonate powder, a fine calcium carbonate powder, and a fine titanium dioxide powder. In consideration of the necessity of the fine powders, processes for preparing a fine barium carbonate powder, a fine strontium carbonate powder, a fine calcium carbonate powder, and a fine titanium dioxide powder have been studied, and already disclosed in the following patent publications.

Patent Publication 1 (Japanese Patent Provisional Publication (Tokuhyohei) 11-514961) discloses a process for preparing a fine alkaline earth metal carbonate powder which comprises the steps of introducing gaseous carbon dioxide into an aqueous alkaline earth hydroxide solution preferably in the presence of a crystalline growth-inhibitor selected from a group consisting of an ammonium salt of a specific carboxylic acid and an alkylammonium salt of a specific carboxylic acid to produce alkaline earth metal carbonate particles, applying shearing force and friction to the produced alkaline earth carbonate particles at a relatively high rate in a homogenizer under high working pressure, recovering thus treated particles, and drying the recovered particles. Patent Publication 1 describes that the process gives a fine strontium carbonate powder having a BET specific surface area of 3 to 50 $m^2/g$ and comprising at least 90% of a powder having a diameter of 0.1 to 1.0 nm, preferably a diameter of 0.2 to 1.0 µm, and a fine barium carbonate powder having a BET specific surface area of 3 to 30 $m^2/g$, preferably 3 to 20 $m^2/g$, more preferably 8 to 15 $m^2/g$, and comprising at least 900% of a powder having a diameter of 0.2 to 0.7 µm. Examples of the crystalline growth-inhibitors are described to include ammonium salts and alkylammonium salts of citric acid, malic acid, adipic acid, gluconic acid, glucaric acid, glucuronic acid, tartaric acid and maleic acid.

Patent Publication 2 (Japanese Patent Provisional Publication 2004-59372) discloses a process for preparing a fine barium carbonate powder which comprises processing a mixture of a barium carbonate slurry and a granular medium in a fluid condition at a high rate, preferably in the presence of a particle growth-inhibitor such as a polyhydric alcohol, ascorbic acid, pyrophosphoric acid, carboxylic acid, or carboxylate. Patent Publication 2 describes that the disclosed process can give a barium carbonate powder having a BET specific surface area of 5 to 50 $m^2/g$ and a mean diameter (determined by a laser diffraction method) of 0.01 to 1.0 µm. Examples of the carboxylic acids and carboxylates employable as the particle growth-inhibitor are described to include citric acid, carboxymethylcellulose, oxalic acid, malonic acid, succinic acid, malic acid, maleic acid, tartaric acid, adipic acid, acrylic acid, polycarboxylic acid, polyacrylic acid, and their salts with sodium or ammonium.

Patent Publication 3 (Japanese Patent Provisional Publication 2006-206425) discloses a process for preparing a fine alkaline earth metal carbonate powder. The process comprises the steps of pulverizing an alkaline earth metal powder and preferably an aqueous solution containing at least one dispersant selected from the group consisting of a polycarboxylic acid having a weight average molecular weight of 1,000 to 20,000 and its salt under a wet condition and spray-drying the obtained dispersion. Patent Publication 3 describes that the disclosed process can give powdery calcium carbonate having a BET specific surface area of 10 to 150 $m^2/g$, a primary particle size of which is in the range of 10 to 80 nm.

Patent Publication 4 (Japanese Patent Provisional Publication 11-1321) discloses a process for preparing a fine titanium dioxide powder which comprises the steps of dissolving titanyl sulfate in a mixture of water and an alcohol and heating the resulting solution under reflux. Patent Publication 4 describes that the disclosed process can give a titanium dioxide powder having a mean diameter of a nano order (in the range of 5.5 to 12.0 nm).

As is described hereinbefore, it is necessary to prepare fine ceramic materials such as a fine barium carbonate powder, a fine strontium carbonate powder, a fine calcium carbonate powder, and a fine titanium dioxide powder for producing a fine dielectric ceramic powder such as a fine barium titanate powder, a fine strontium titanate powder or a fine barium calcium titanate powder.

Generally, the dielectric ceramic powder is produced in industry by mixing the starting material powders under wet conditions. Therefore, it is preferred that the starting material powders can be dispersed in an aqueous medium to give a dispersion containing essentially primary particles by means of industrially employable dispersing procedures.

As is described above, it has been known that a very fine titanium dioxide powder can be prepared. However, the strontium carbonate powder and barium carbonate powder disclosed in Patent Publication 1 have a relatively large particle diameter.

Further, as is described in Patent Publications 2 and 3, a very fine alkaline earth metal carbonate powder can be obtained by pulverizing an alkaline earth metal carbonate powder in an aqueous medium utilizing a granular medium. There is problem, however, in that a dried powder is firmly aggregated due to van der Waals force and not easily re-dispersed in an aqueous solvent to give a dispersion containing the very fine powder, if the obtained fine powder in an aqueous medium is once dried.

SUMMARY OF THE INVENTION

Accordingly, it is an object of the invention to provide a highly dispersible fine alkaline earth metal powder which can be dispersed in an aqueous medium by industrially employable dispersing procedures to give a dispersion containing essentially primary particles.

The inventors have studied a relationship between the pore volume and dispersibility for the alkaline earth metal carbonate powder and discovered that a fine alkaline earth metal carbonate powder in which its primary particle has a mean diameter of 30 to 90 nm, in which the mean diameter is measured on a circle obtained from a projected area of the primary particle, and in which an accumulated volume of micropores having a pore size in the range of 10 to 20 nm is not less than $5 \times 10^{-2}$ cm$^3$/g can be easily dispersed in an aqueous medium.

Accordingly, the present invention resides in a highly dispersible fine powder of an alkaline earth metal carbonate selected from the group consisting of barium carbonate, strontium carbonate and calcium carbonate, in which a primary particle of the powder has a mean diameter of 30 to 90 nm, the mean diameter being measured on a circle obtained from a projected area of the primary particle, and in which an accumulated volume of micropores having a pore size in the range of 10 to 20 nm is not less than $5 \times 10^{-2}$ cm$^3$/g.

The accumulated volume of micropores having a pore size in the range of 10 to 20 nm can be determined by the steps of measuring an accumulated volume of micropores from base micropores (micropores having pore sizes lower than 10 nm) to micropores having the pore diameter of 20 nm, and an accumulated volume of micropores from the base micropores to micropores having the pore diameter of 10 nm, and subtracting the latter accumulated volume from the former accumulated volume.

Preferred embodiments of the highly dispersible fine alkaline earth metal carbonate powder according to the invention are described below.

(1) The mean diameter measured on a circle obtained from a projected area of the primary particle is in the range of 40 to 80 nm.

(2) The accumulated volume of micropores having a pore size in the range of 10 to 20 nm is in the range of $5 \times 10^2$ to $15 \times 10^{-2}$ cm$^3$/g.

(3) An accumulated volume of micropores having a pore size of less than 10 nm is not more than $4 \times 10^2$ cm$^3$/g.

(4) The fine powder has a mean aspect ratio of not higher than 2.

(5) The alkaline earth metal carbonate is barium carbonate.

(6) The alkaline earth metal carbonate is strontium carbonate.

(7) The fine powder has a polymer of a polycarboxylic acid, an anhydride thereof, or a salt thereof on a surface thereof.

(8) The fine powder has a volume-based mean diameter of not more than 500 nm, in which the volume-based mean diameter can be determined from a volume-based diameter distribution which is measured in a dispersion according to a laser diffractive-scattering method, the dispersion having been prepared by placing 0.5 g of the powder in 50 mL of an aqueous solution containing 0.2 wt. % of sodium hexamethaphosphate and dispersing the powder in the solution for 6 minutes in a ultrasonic bath at a power of 55 W, and which does not contain particles having a particle size of not less than 1,000 nm in an amount of higher than 5 vol. %.

Effects of the Invention

The fine alkaline earth metal carbonate powder can be dispersed in an aqueous medium employing industrially employable dispersing procedures to give a dispersion containing essentially primary particles. Therefore, the fine alkaline earth metal carbonate powder can be easily mixed with other fine inorganic material powder to give a uniform powdery mixture by means of wet-mixing procedures.

PREFERRED EMBODIMENTS OF THE INVENTION

A primary particle of the fine alkaline earth metal carbonate powder of the invention has a mean diameter of 30 to 90 nm, preferably 40 to 80 nm, in which the mean diameter can be measured on a circle obtained from a projected area of a primary particle.

The mean diameter measured on a circle obtained from a projected area (that is the Heywood diameter) corresponds a diameter of a circle having the same area as the area of the projected figure. For the primary particle, the diameter measured on a circle obtained from a projected area can be determined by means of image analysis of an electron microscopic image, comprising the steps of obtaining a projected area of each primary particle from the electron microscopic image and calculating a diameter of a circle having the same area as the area of the projected area.

The highly dispersible fine alkaline earth metal carbonate of the invention preferably shows a variation coefficient of the mean diameter is not more than 40%, more preferably not more than 35%. The variation coefficient of the mean diameter means a percentage obtained by dividing a standard deviation of the diameters of the circles of the projected areas by a mean value of the diameters of the circles of the projected areas.

The highly dispersible fine alkaline earth metal carbonate of the invention has micropores whose accumulated volume of micropores having a pore size in the range of 10 to 20 nm is not less than $5 \times 10^{-2}$ cm$^3$/g, preferably in the range of $5 \times 10^{-2}$ to $15 \times 10^{-2}$ cm$^3$/g, more preferably in the range of $7 \times 10^{-2}$ to $15 \times 10^{-2}$ cm$^3$/g. It is considered that the micropores having a pore size in the range of 10 to 20 nm correspond to spaces between the adjacent primary particles which constitute the aggregated particles of the alkaline earth metal carbonate. The fine alkaline earth metal carbonate powder of the invention has large spaces between the primary particles, and hence an aqueous medium easily enters the spaces of the fine powder when the fine powder is placed in the aqueous medium. Therefore, the fine powder can be easily dispersed in an aqueous medium.

In the highly dispersible fine alkaline earth metal carbonate of the invention, an accumulated volume of micropores having a pore size of less than 10 nm is not more than $4 \times 10^{-2}$ cm$^3$/g, preferably in the range of $0.1 \times 10^2$ to $3 \times 10^{-2}$ cm$^3$/g.

The highly dispersible fine alkaline earth metal carbonate powder of the invention preferably comprises primary particles in essentially cubic or globular form.

The primary particles preferably have an aspect ratio (size along the long axis/size along the short axis) of not more than 2. The aspect ratio is determined by a ratio of a longer side to a shorter side of a rectangular square having a smallest area which is drawn in contact with the periphery of the particle.

The highly dispersible fine alkaline earth metal carbonate powder of the invention can be prepared by a process comprising the steps of carbonating an alkaline earth metal hydroxide by introducing gaseous carbon dioxide into an aqueous alkaline earth metal hydroxide solution or an aqueous alkaline earth metal hydroxide dispersion under stirring, to give an alkaline earth metal carbonate particles, pulverizing the alkaline earth metal carbonate particles in an aqueous medium using ceramic beads having a mean diameter of 10 to 1,000 μm, and drying the pulverized powder.

The aqueous alkaline earth metal hydroxide solution or aqueous alkaline earth metal hydroxide dispersion preferably contains the alkaline earth metal hydroxide in a concentration of 1 to 20 wt. %, preferably 2 to 10 wt. %, based on the total amount of the solution or dispersion.

To the solution or dispersion of an alkaline earth metal hydroxide, a crystal growth-inhibitor can be added. The crystal growth-inhibitor can be added in an amount preferably in the range of 0.01 to 20 wt. % based on the amount of the amount of the produced alkaline earth metal carbonate. Examples of the carboxylic acid include oxalic acid, succinic acid, malonic acid, citric acid, malic acid, adipic acid, gluconic acid, glucaric acid, glucuronic acid, tartaric acid and maleic acid. Examples of the carboxylates include their salts of magnesium, calcium, strontium and barium. The crystal growth-inhibitor preferably is a carboxylic acid or ascorbic acid. Citric acid is most preferred.

The gaseous carbon dioxide is preferably fed into an aqueous solution or dispersion of an alkaline earth metal hydroxide at a feed rate of 0.5 to 200 mL/min., preferably a feed rate of 0.5 to 100 mL/min., per 1 g of the alkaline earth metal hydroxide. The gaseous carbon dioxide can be fed into the aqueous solution or dispersion alone or with an inert gas (inert to the alkaline earth metal hydroxide) such as nitrogen, argon, oxygen or air. The completion of carbonatation of the alkaline earth metal hydroxide can be determined at a time when the aqueous solution or dispersion reaches pH 7 or less.

The aqueous solution or dispersion of an alkaline earth metal hydroxide is kept at a temperature of not lower than 2° C., preferably 5 to 100° C., more preferably 5 to 50° C., when the aqueous solution or dispersion is subjected to the carbonatation of the alkaline earth metal carbonate.

The primary particle of the alkaline earth metal carbonate obtained in the above-described manner is cubic, globular or acicular. The size (i.e., mean diameter being measured on a circle obtained from a projected area of a primary particle) of the primary particle can be more than 90 nm.

In the invention, the alkaline earth metal carbonate particles are pulverized in an aqueous medium using ceramic beads having a mean particle size of 10 to 1,000 μm, and dried to give the fine alkaline earth metal carbonate powder.

The aqueous dispersion of the alkaline earth metal carbonate powder for the use in the pulverization preferably is an aqueous dispersion containing 10 to 40 wt. % of the alkaline earth metal powder (i.e., solid content) in the aqueous medium. The amount of the solid content is determined based on the amount of the aqueous medium and solid content. If the solid content in the alkaline earth metal carbonate dispersion is too low, the dispersibility may decrease, while if the solid content is too high, the viscosity of the dispersion may so increase as to disturb pulverization.

Prior to or in the course of the pulverization, a dispersant is preferably added to the alkaline earth metal dispersion so as to place the dispersant on the surface of the fine alkaline earth metal carbonate powder produced by the pulverization. The dispersant preferably is a polycarboxylic acid dispersant comprising a polymer such as a polycarboxylic acid, its anhydride, or its salt. The polycarboxylic acid dispersant preferably is an ammonium salt of a polycarboxylic acid containing no Na which is not preferable for the use as electronic material or an acid dispersant which is not neutralized with a cation. Examples of the preferred dispersants include SN Dispersant 5020 and 5468 (both available from Sunnopco Co., Ltd.), Poise 532A, 2100 (both available from Kao Corporation), and MARIARIM AKM0531, AKM-1511-60, HKM-50A and HKM-150A (all available from Nippon Oil and Fat Co., Ltd.). The dispersant is preferably added in an amount of 0.5 to 20 wt. %, more preferably in an amount of 1 to 10 wt. %, based on the amount of the solid content in the aqueous medium. The dispersant is preferably added to the alkaline earth metal carbonate dispersion in the course of pulverization, for instance after a lapse of 1/10 of the pulverization period and before a lapse of 9/10 of the pulverization period.

The dispersion of the alkaline earth metal carbonate particles obtained by the carbonatation of an alkaline earth metal hydroxide in an aqueous medium can be as such employed for the pulverization with no processing or after it is concentrated. Alternatively, the prepared aqueous alkaline earth metal carbonate dispersion can be once dried to give an alkaline earth metal carbonate powder, and then the resulting powder can be re-dispersed in an aqueous media to give an alkaline earth metal carbonate powder for pulverization.

The ceramic beads can be known beads for pulverizing procedures, for instance, zirconium oxide beads and aluminum oxide beads. The beads preferably has a mean particle diameter in the range of 10 to 1,000 μm, more preferably in the range of 30 to 500 μm.

The pulverizing apparatus can be a known media mill employable for pulverization of ordinary particles. The pulverization in a media mill can be performed using a beads stirring paddle which rotates at a circumferential speed in the range of 3 to 15 m/min., preferably 5 to 9 m/min.

The pulverization can be performed for a period of 1 to 200 minutes (period for processing in the mill), preferably 10 to 100 minutes, which depends on the alkaline earth metal carbonate content in the aqueous alkaline earth metal carbonate dispersion and the mean diameter of the ceramic beads.

The pulverized aqueous alkaline earth metal carbonate dispersion can be dried using known dryers, preferably a spray dryer or a drum dryer. The drying procedure using a spray dryer is preferred.

The highly dispersible fine alkaline earth metal carbonate powder of the invention can be dispersed in an aqueous medium in the form of essentially primary particles by industrially employable dispersing methods such as stirring or application of ultrasonic wave in an ultrasonic bath.

The highly dispersible fine alkaline earth metal carbonate powder of the invention generally has a volume-based mean particle diameter of not more than 500 nm, specifically not more than 300 nm, and contains particles having a particle diameter of 1,000 nm or more in an amount of ordinarily 5 vol. % or less, specifically 1 vol. % or less. The volume-based mean particle diameter is obtainable from a volume-based particle diameter distribution which is determined in a dispersion prepared by placing 0.5 g of the powder in 50 mL of an aqueous solution containing 0.2 wt. % of sodium hexamethaphosphate and dispersing the powder in the solution for 6 minutes in an ultrasonic bath at a power of 55 W according to a laser diffractive-scattering method. The volume-based mean particle diameter obtained in the above-mentioned manner generally is 1 to 10 times (specifically 1 to 5 times) as much as the mean diameter measured on a circle obtained from a projected area of a primary particle.

EXAMPLES

Example 1

In a 5 L-volume Teflon-made reaction vessel, 4,200 g of ion exchanged water and 450 g of strontium hydroxide octahydrates (calcium content: not more than 0.001 wt. %, barium content: not more than 0.001 wt. %, sulfur content: not more than 0.001 wt. %) were placed to prepare an aqueous strontium hydroxide dispersion having a strontium hydroxide content of 4.43 wt. %. The resulting mixture was warmed to 40° C. in a warm bath and stirred under feeding a mixture of air and gaseous carbon dioxide at a feed rate of 5 L/min. for air and 5 L/min. for gaseous carbon dioxide. (approx. 24 mL/min. for air and approx. 24 mL/min. for gaseous carbon dioxide, per one gram of strontium hydroxide in the dispersion) to carbonate strontium hydroxide, resulting in production of strontium carbonate particles. In the course of progress of carbonatation, the dispersion was subjected to pH measurement, and the introduction of gaseous carbon dioxide was stopped when the dispersion showed a pH value less than 7.

The resulting strontium carbonate dispersion is adjusted to have a solid content of 13 wt. %, and pulverized in a media mill (type: AMC 12.5, effective volume: 9.0 L, available from Ashizawa FineTech Co., Ltd.) using zirconium oxide beads (mean size: 300 μm) under such conditions that the amount of charged beads was 80 vol. %, the circumferential speed was 7 m/sec., and a processing period was 69 minutes. At a lapse of 35 minutes of the processing period, an SN dispersant 5468 (ammonium polycarboxylate, available from Sunnopco, Co., Ltd.) was added to the dispersion in an amount of 6 wt. % based on the amount of the solid content in the dispersion.

After the pulverization was complete, the pulverized strontium carbonate dispersion was dried by means of a spray dryer to obtain a fine strontium carbonate powder. The obtained fine strontium carbonate powder had a BET specific surface area of 38.0 $m^2/g$. It was confirmed by observation using FE-SEM (Field Emission Scanning Electron Microscope) that the fine strontium carbonate powder comprised fine particles.

The processing of the FE-SEM image using an image analysis software (MacView ver. 3.5, available from Mountech Co., Ltd.) indicated that a mean diameter measured on a circle obtained from a projected area of a primary particle was 60 nm, a variation coefficient of the mean diameter was 25%, and a mean aspect ratio was 1.30.

The obtained fine strontium carbonate powder was subjected to measurement of micro pore distribution by the below-described method. It was determined that the accumulated volume of micropores having a pore size of less than 10 nm was $2.52 \times 10^{-2}$ $cm^3/g$ and the accumulated volume of micropores having a pore size in the range of 10 to 20 nm was $7 \times 10^{-2}$ $cm^3/g$.

The volume-based mean diameter of the fine strontium carbonate powder measured by a laser diffractive-scattering method was 156 nm, which was approx. 2.6 times as much as the mean diameter (60 nm) measured on a circle obtained from a projected area of a primary particle. Particles having a diameter of 1,000 nm or more ware not found. Therefore, it was confirmed that the fine strontium carbonate powder was well dispersed.

[Measurement of Micro-Pore Diameter Distribution]

A desorption isothermal curve is obtained by a nitrogen gas adsorption method by means of an automatic gas adsorption measuring apparatus (AUTOSORB-3B, available from Quantachrome Co., Ltd.), From the obtained desorption isothermal curves, distribution of an accumulated micro-pore volume is obtained by the BJH method. The desorption isothermal curve is obtained using a sample powder in an amount of 0.2 to 0.3 g which is dried for one hour by degassing at 200° C. by means of a vacuum pump.

[Measurement of Volume-Based Particle Size Distribution According to Laser Diffractive-Scattering Method]

The sample powder (0.5 g) and an aqueous solution (50 mL) containing 0.2 wt. % of sodium hexamethaphosphate are placed in a 100 mL-volume glass beaker, and subjected to a dispersing procedure using an ultrasonic bath (UA-1A, available from Asone, Co., Ltd) for 6 minutes at a power of 55 W, to give a strontium carbonate dispersion. The volume-based particle size distribution of the strontium carbonate particles contained in the dispersion is measured by means of a laser diffractive-scattering particle diameter measuring apparatus (Microtrack HRA, available Nikkiso Co., Ltd.).

Example 2

In a 5 L volume Teflon-made reaction vessel, 4,200 g of ion exchanged water and 500 g of strontium hydroxide octahydrates (calcium content: not more than 0.001 wt. %, barium content: not more than 0.001 wt. %, sulfur content: not more than 0.001 wt. %) were placed to prepare an aqueous strontium hydroxide dispersion having a strontium hydroxide content of 4.87 wt. %. To the strontium hydroxyide dispersion was added 1.3 g of citric acid monohydrate, and the resulting mixture was stirred at 20° C. for 10 minutes by means of a stirrer to convert it to an aqueous solution. To the resulting solution was introduced under stirring gaseous carbon dioxide at a feed rate of 5 L/min. (approx. 22 mL/min., per one gram of strontium hydroxide in the dispersion) to carbonate strontium hydroxide, resulting in production of strontium carbonate particles. In the course of progress of carbonatation, the dispersion was subjected to pH measurement, and the introduction of gaseous carbon dioxide was stopped when the dispersion showed a pH value less than 7.

The resulting strontium carbonate dispersion was adjusted to have a solid content of 11 wt. %, and pulverized in the media mill used in Example 1 using zirconium oxide beads (mean size: 300 μm) under such conditions that the amount of charged beads was 80 vol. %, the circumferential speed was 7 m/sec., and a processing period was 60 minutes. At a lapse of 30 minutes of the processing period, a MARIARIN AKM-1511-60 (polycarboxylic acid anhydride having a side chain of a polyoxyalkylene group, available from Nippon Fat and Oil, Co., Ltd.) was added to the dispersion in an amount of 8 wt. % based on the amount of the solid content in the dispersion.

After the pulverization was complete, the pulverized strontium carbonate dispersion was dried by means of a spray dryer to obtain a fine strontium carbonate powder. The obtained fine strontium carbonate powder had a BET specific surface area of 15.6 $m^2/g$. It was confirmed by observation using FE-SEM that the fine strontium carbonate powder comprised fine particles.

The processing of the FE-SEM image using an image analysis software indicated that a mean diameter measured on a circle obtained from a projected area of a primary particle was 47 nm, a variation coefficient of the mean diameter was 28%, and a mean aspect ratio was 1.37.

The obtained fine strontium carbonate powder was subjected to measurement of micro pore distribution in the manner described in Example 1. It was determined that the accumulated volume of micropores having a pore size of less than 10 nm was $2.75 \times 10^{-2}$ $cm^3/g$ and the accumulated volume of micropores having a pore size in the range of 10 to 20 nm was $9.15 \times 10^{-2}$ $cm^3/g$.

The volume-based mean diameter of the fine strontium carbonate powder measured by a laser diffractive-scattering method in the same manner as in Example 1 was 144 nm, which was approx. 3.1 times as much as the mean diameter (47 nm) measured on a circle obtained from a projected area of a primary particle. Particles having a diameter of 1,000 nm or more ware not found. Therefore, it was confirmed that the fine strontium carbonate powder was well dispersed.

Reference Example 1

In a 5 L volume Teflon-made reaction vessel, 4,200 g of ion exchanged water and 500 g of strontium hydroxide octahydrates (calcium content: not more than 0.001 wt. %, barium content: not more than 0.001 wt. %, sulfur content: not more than 0.001 wt. %) were placed to prepare an aqueous strontium hydroxide dispersion having a strontium hydroxide content of 4.87 wt. %. The strontium hydroxide dispersion was warmed in a warm bath to adjust its temperature to 50° C. To the resulting dispersion was introduced under stirring gaseous carbon dioxide at a feed rate of 5 L/min. (approx. 22 mL/min., per one gram of strontium hydroxide in the dispersion) to carbonate strontium hydroxide, resulting in production of strontium carbonate particles. In the course of progress of carbonatation, the dispersion was subjected to pH measurement, and the introduction of gaseous carbon dioxide was stopped when the dispersion showed a pH value less than 7.

The resulting strontium carbonate dispersion was adjusted to have a solid content of 7 wt. %, and pulverized in the media mill used in Example 1 using zirconium oxide beads (mean size: 300 μm) under such conditions that the amount of charged beads was 80 vol. %, the circumferential speed was 7 m/sec., and a processing period was 53 minutes. At a lapse of 20 minutes of the processing period, a Poise 2100 (ammonium polycarboxylate, available from Kao Corporation) was added to the dispersion in an amount of 8 wt. % based on the amount of the solid content in the dispersion.

After the pulverization was complete, the pulverized strontium carbonate dispersion was dried by means of a spray dryer to obtain a fine strontium carbonate powder. The obtained fine strontium carbonate powder had a BET specific surface area of 40.2 m$^2$/g. It was confirmed by observation using FE-SEM that the fine strontium carbonate powder comprised fine particles.

The processing of the FE-SEM image using an image analysis software indicated that a mean diameter measured on a circle obtained from a projected area of a primary particle was 63 nm, a variation coefficient of the mean diameter was 32%, and a mean aspect ratio was 1.28.

The obtained fine strontium carbonate powder was subjected to measurement of micro pore distribution in the manner described in Example 1. It was determined that the accumulated volume of micropores having a pore size of less than 10 nm was $1.98 \times 10^{-2}$ cm$^3$/g and the accumulated volume of micropores having a pore size in the range of 10 to 20 nm was $4.89 \times 10^{-2}$ cm$^3$/g.

The volume-based mean diameter of the fine strontium carbonate powder measured by a laser diffractive-scattering method in the same manner as in Example 1 was 3,337 nm, which was approx. 53 times as much as the mean diameter (63 nm) measured on a circle obtained from a projected area of a primary particle. Thus, the volume-based mean diameter of the fine strontium carbonate powder was very large, as compared with those of the fine strontium carbonate powders of Examples 1 and 2.

Example 3

In a 5 L volume Teflon-made reaction vessel, 3,000 g of ion exchanged water and 404.5 g of barium hydroxide were placed to prepare an aqueous barium hydroxide dispersion having a barium hydroxide content of 5.17 wt. %. To the barium hydroxide dispersion was added 4.2 g of citric acid monohydrate. The reaction vessel was cooled under stirring the dispersion to adjust the temperature of the dispersion to 10° C. To the resulting dispersion was introduced under stirring gaseous carbon dioxide at a feed rate of 0.5 L/min. (approx. 2.8 mL/min., per one gram of barium hydroxide in the dispersion) to carbonate barium hydroxide, resulting in production of barium carbonate particles. In the course of progress of carbonatation, the dispersion was subjected to pH measurement, and the introduction of gaseous carbon dioxide was stopped when the dispersion showed a pH value less than 7.

The resulting barium carbonate dispersion was adjusted to have a solid content of 9 wt. %, and placed in a polypropylene vessel containing zirconium oxide beads (mean size: 300 μm) in an amount of 70 vol. % of the total volume of the vessel under such condition that the total amount of the content in the vessel was made to 81.5 vol. %. The barium carbonate particles of the dispersion placed in the vessel were pulverized by means of a rocking mill. At a lapse of 30 minutes of the processing period, a MARIARIM AKM-1511-60 (available from Nippon Fat and Oil, Co., Ltd.) was added to the dispersion in an amount of 6 wt. % based on the amount of the solid content in the dispersion. Then, the pulverization by the rocking mill was continued for 20 minutes.

After the pulverization was complete, the pulverized barium carbonate dispersion was dried by means of a spray dryer to obtain a fine barium carbonate powder. It was confirmed by observation using FE-SEM that the fine barium carbonate powder comprised fine particles.

The processing of the FE-SEM image using an image analysis software indicated that a mean diameter measured on a circle obtained from a projected area of a primary particle was 61 nm, a variation coefficient of the mean diameter was 22%, and a mean aspect ratio was 1.58.

The obtained fine barium carbonate powder was subjected to measurement of micro pore distribution in the manner described in Example 1. It was determined that the accumulated volume of micropores having a pore size of less than 10 nm was $2.18 \times 10^{-2}$ cm$^3$/g and the accumulated volume of micropores having a pore size in the range of 10 to 20 nm was $10.2 \times 10^{-2}$ cm$^3$/g.

The volume-based mean diameter of the fine strontium carbonate powder measured by a laser diffractive-scattering method in the same manner as in Example 1 was 252 nm, which was approx. 4.1 times as much as the mean diameter (61 nm) measured on a circle obtained from a projected area of a primary particle. Particles having a diameter of 1,000 nm or more ware not found. Therefore, it was confirmed that the fine barium carbonate powder was well dispersed.

What is claimed is:

1. A fine powder of an alkaline earth metal carbonate selected from the group consisting of barium carbonate and strontium carbonate, in which a primary particle of the powder has a mean diameter of 30 to 90nm, the mean diameter being measured on a circle obtained from a projected area of the primary particle, and in which an accumulated volume of micropores having a pore size in the range of 10 to 20 nm is not less than $5 \times 10^{-2}$ cm$^3$/g.

2. The fine powder of an alkaline earth metal carbonate according to claim 1, in which the accumulated volume of micropores having a pore size in the range of 10 to 20nm is in the range of $5 \times 10^{-2}$ to $15 \times 10^{-2}$ cm$^3$/g.

3. The fine powder of an alkaline earth metal carbonate according to claim 1, in which an accumulated volume of micropores having a pore size of less than 10 nm is not more than $4\times10^{-2}$ cm$^3$/g.

4. The fine powder of an alkaline earth metal carbonate according to claim 1, in which the fine powder has a mean aspect ratio of not higher than 2.

5. The fine powder of an alkaline earth metal carbonate according to claim 1, in which the fine powder has a polymer of a polycarboxylic acid, an anhydride thereof, or a salt thereof on a surface thereof.

6. The fine powder of an alkaline earth metal carbonate according to claim 1, which has a volume-based mean diameter of not more than 500 nm, the volume-based mean diameter being determined from a volume-based diameter distribution which is measured in a dispersion according to a laser diffractive-scattering method, the dispersion having been prepared by placing 0.5 g of the powder in 50 mL of an aqueous solution containing 0.2 wt. % of sodium hexametaphosphate and dispersing the powder in the solution for 6 minutes in a ultrasonic bath at a power of 55 W, and which does not contain particles having a particle size of not less than 1,000 nm in an amount of higher than 5 vol. %.

7. The fine powder of an alkaline earth metal carbonate according to claim 1, in which the accumulated volume of micropores having a pore size in the range of 10 to 20 nm is in the range of $7\times10^{-2}$ to $15\times10^{-2}$ cm$^3$/g.

* * * * *